(No Model.)

A. W. H. SMITH.
MILK CAN.

No. 401,863. Patented Apr. 23, 1889.

WITNESSES:
Phil C. Dieterich
C. Sedgwick

INVENTOR.
Agnes W. H. Smith
BY Munn & Co.
ATTORNEYS.

UNITED STATES PATENT OFFICE.

AGNES W. H. SMITH, OF BEAVER DAM, WISCONSIN.

MILK-CAN.

SPECIFICATION forming part of Letters Patent No. 401,863, dated April 23, 1889.

Application filed May 8, 1888. Serial No. 273,168. (No model.)

*To all whom it may concern:*

Be it known that I, AGNES W. H. SMITH, of Beaver Dam, in the county of Dodge and State of Wisconsin, have invented a new and Improved Milk-Can, of which the following is a full, clear, and exact description.

My invention relates to cans for holding milk while in storage or transit and for convenient delivery in any required quantity; and the invention has for its object to provide a can or holder of this character which will keep the milk cool, pure, sweet, and clean, and will not allow unnecessary agitation or churning of the milk prior to its delivery to the consumers.

The invention consists in certain novel features of construction and combinations of parts of the milk can or holder, all as hereinafter described and claimed.

Reference is to be had to the accompanying drawings, forming a part of this specification, in which similar letters of reference indicate corresponding parts in all the figures.

Figure 1:
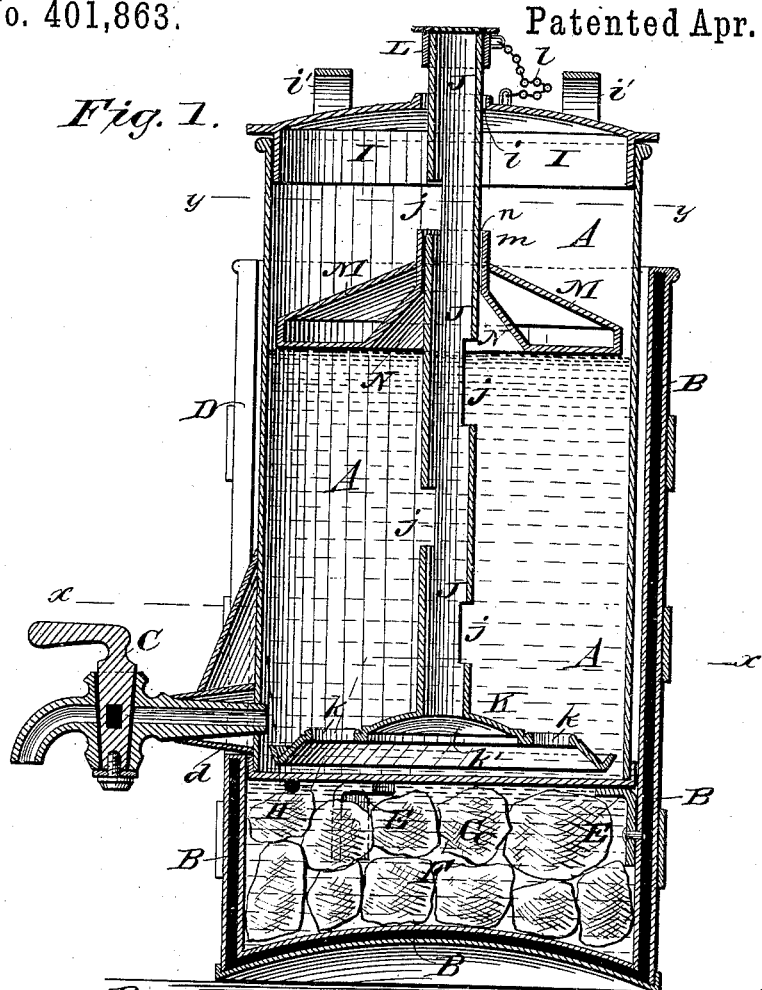
Figure 2:
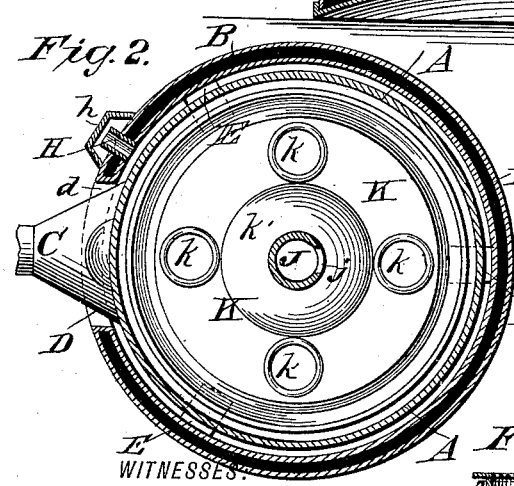
Figure 3:
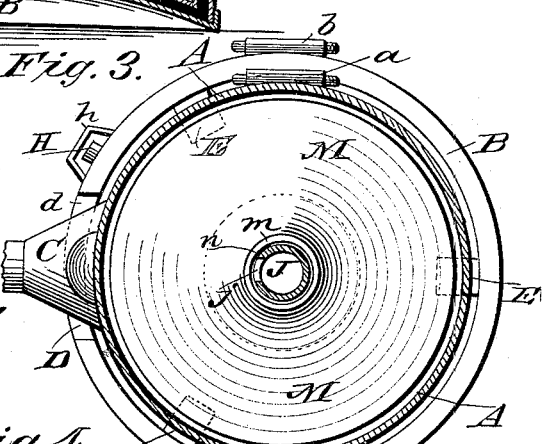
Figure 4:
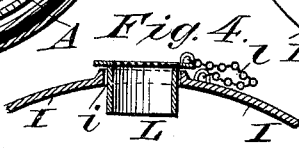

Figure 1 is a central vertical sectional elevation of my improved milk-can. Fig. 2 is a plan view in horizontal section on the irregular line $x$ $x$ in Fig. 1. Fig. 3 is a plan view in horizontal section on the line $y$ $y$ in Fig. 1; and Fig. 4 is a detail sectional view illustrating the dust guard or cap as applied directly to the milk-vessel cover.

The milk-can comprises the milk-vessel A and its appurtenances, presently described, and a jacket, B, in which the vessel A is placed. The milk-vessel has a faucet, C, at one side, at its lower end; and, to accommodate this faucet and allow the vessel to be freely placed in and lifted from the jacket, the latter is provided at one side with a vertical slot or opening, D, which extends from the top of the jacket to a point or level at $d$ a little above the tops of a series of brackets, E, preferably three in number, and which are fixed to the inner wall of the jacket to support the milk-vessel A within the jacket, and at some little distance from its bottom to provide a chamber, F, below the vessel, in which chamber ice, G, may be placed, to have a refrigerating effect on the contents of the vessel and cause the animal heat in the milk to rise to the top and escape thereat, in a manner hereinafter explained.

An overflow outlet or pipe, H, is provided in and through the side walls of the jacket at a point about level with the milk-vessel-supporting flanges E, or a little above them, whereby the ice or the ice-cold water in the refrigerating-chamber F will always be in contact with the bottom of the vessel A, to cool the milk therein. The guard $h$ (shown in Figs. 2 and 3 of the drawings) is a metal strip or bridge-piece, which is fastened at both ends to the outer wall of the jacket, and extends across the top of the overflow-pipe H and prevents breaking off or other damage to the pipe, which preferably projects a little beyond the wall of the jacket.

It will be noticed that the jacket B is made with double walls, providing an air-space between them all around the sides and bottom, which thus protects the milk-vessel, except at the slot D, from extremes of either heat or cold, and has direct tendency to keep the milk cool and sweet in hot weather and prevent its freezing in cold weather. The jacket B, and consequently the milk-vessel which fits within the jacket, is shown cylindrical in general form; but I wish it to be understood that I may make both milk-vessel and jacket in oval, square, or rectangular cross-sectional form, and of any size, as the conditions of their use in any particular locality may require. Should the faucet C not be used on the milk-vessel, as would be the case with outfits made for shipping milk by rail or steamer for any considerable distance, the slot D in the jacket B would in this case be dispensed with.

The drawings show the jacket and milk-vessel made of sheet metal; but any other suitable or approved material may be used for this purpose. The milk-vessel A and jacket B are provided, respectively, with handles $a$ $b$, for convenience in moving them about as required.

The milk-vessel A has a cover or lid, I, which fits its top quite closely, and is provided with a central hole, $i$, through which the hollow shaft or handle J of the dasher will be passed when the dasher is used, said hole $i$ allowing direct escape from or through it of the hot animal gases from the milk when the dasher is not used, and when the dasher is used its hollow handle J, which passes through the hole $i$, will serve either wholly or mainly as an exit-passage for the gases from the milk-vessel. The dasher is intended for use simply to thoroughly mix or agitate the milk occasionally during delivery of it by reciprocating the dasher through the milk, and the dasher head or plate K may have any suitable form answering this purpose. A preferred form for it is shown in Figs. 1 and 2 of the drawings, wherein it appears with an upwardly-bulged central portion and downwardly and upwardly bent margin, giving sufficient strength to allow openings $k$ to be made through it for free passage of the milk, to facilitate the quick and easy mixing of it as occasion may require. The hollow dasher-handle J opens directly to the central interior space, $k'$, of the dasher-head, and thus facilitates the escape of hot gases from the very bottom of the milk-vessel directly into the handle, to the surface of the milk in the vessel, and thence through one or more of the side openings, $j$, of the handle to its interior, and thence out at the top of the handle. The vertically-ranging series of side openings, $j$, in the dasher-handle extend at intervals for quite the full length of the handle, to facilitate free escape of the hot gases from any quantity of milk which may be in the vessel A.

A cap, L, having a perforated or screen material top, may be fitted to the top of the dasher-handle when the dasher is used, as shown in Fig. 1 of the drawings, and should the dasher not be used the cap will be applied directly to the vessel-cover I within its hole $i$, from which the gases will then escape. In either case the screen-cap will prevent entrance of dust to the milk-vessel. I prefer to hold the cap to the vessel-cover I by a chain or cord, $l$, that it may always be conveniently at hand for application to the dasher-handle or cover-hole, as may be required. The cap is shown applied to the cover in Fig. 4 of the drawings. The cover I has suitable handles, $i'$, for convenience in adjusting it to or removing it from the milk-vessel.

Within the milk-vessel is placed a float, M, preferably made hollow and resting on top of the milk, to prevent undue spattering or injurious churning of it during transportation. The float is provided with a central opening, $n$, bounded by a collar or wall, $m$, which fits loosely upon the dasher-handle J when the dasher is used. In the lower side or face of the float it is provided with a chamber, N, which communicates with the central opening, $n$, within the collar $m$ of the float. This chamber N, which preferably has an upwardly-tapering form, serves as a reservoir into which the heated gases rising from the milk may freely collect prior to their passage through the opening $n$ around the dasher-handle, or into the handle through one of the side openings, $j$, thereof. It will be noticed that these openings $j$ extend above the point reached by the milk, so that the air and gases can at all times enter the tube. If the openings were only at the lower half of the tube, they would be sealed by the milk, and the air and gases could not pass into the tube. If the tube had no outlet exterior to the can, the air and gases could not escape even if the tube were perforated throughout its portion normally within the can. I find in practice that this float, having a concavity or tapering chamber, N, at its under side, gives very much freer escape to the gases from the milk than a flat float resting on top of the milk and provided only with a central hole for outlet of the gases will allow. When the dasher is not used, the gases will escape directly through the chamber N and passage $n$ to the top of the vessel A, above the milk, and thence out from the vessel through the opening $i$ of the cover I, as will readily be understood.

Having thus described my invention, what I claim as new, and desire to secure by Letters Patent, is—

1. The combination, with the can and its top, having a central opening, of a dasher having a central aperture, a tube registering with said aperture and having side apertures extending above the line reached by the milk, and having an opening above the top of the can, substantially as set forth.

2. The combination, with a milk-vessel having an apertured cover, of a dasher having a hollow handle, open at its ends, fitted through said cover-opening, and provided with a vertically-ranging series of side apertures, and a float fitted around the dasher-handle and provided with an enlarged gas-chamber at its under side adapted to register with one of said apertures, substantially as herein set forth.

AGNES W. H. SMITH.

Witnesses:
EDW. ELWELL,
M. E. BURKE.